US007889661B2

United States Patent
Lee et al.

(10) Patent No.: US 7,889,661 B2
(45) Date of Patent: Feb. 15, 2011

(54) CONSTRAINED MULTIPATH ROUTING METHOD IN A MULTI-PROTOCOL LABEL SWITCHING (MPLS) NETWORK

(75) Inventors: Youngseok Lee, Seoul (KR); Changhoon Kim, Daejeon (KR); Yongho Seok, Seoul (KR); Yanghee Choi, Seoul (KR); Taesoo Jeong, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 2794 days.

(21) Appl. No.: 10/092,103

(22) Filed: Mar. 6, 2002

(65) Prior Publication Data

US 2003/0099194 A1 May 29, 2003

(30) Foreign Application Priority Data

Nov. 28, 2001 (KR) .............................. 2001-74723

(51) Int. Cl.
    H04L 12/28 (2006.01)
(52) U.S. Cl. ........................................ 370/238; 370/351
(58) Field of Classification Search ........................ None
    See application file for complete search history.

(56) References Cited

U.S. PATENT DOCUMENTS 5,727,051 A 3/1998 Holender 6,538,991 B1 * 3/2003 Kodialam et al. ........... 370/229
6,584,071 B1 * 6/2003 Kodialam et al. ........... 370/238
6,724,722 B1 * 4/2004 Wang et al. ................. 370/229
6,778,496 B1 * 8/2004 Meempat et al. ............ 370/230

OTHER PUBLICATIONS

Analytical Framework for Dynamic Traffic Partitioning in MPLS Networks by E. Dinan et al.
Internet Traffic Engineering Without full mesh overlaying by Y. Wang.
Explicit Routing Algorithms for internet traffic engineering by Y. Wang et al.

* cited by examiner

*Primary Examiner*—Chau Nguyen
*Assistant Examiner*—Jordan Hamann
(74) *Attorney, Agent, or Firm*—Blakely Sokoloff Taylor & Zafman

(57) ABSTRACT

Disclosed herein is a constrained multipath routing method. In a Multi-Protocol Label Switching (MPLS) network, network conditions and traffic engineering requirements assigned to each link are set. The amount of assignments of each traffic requirement assigned to each link and a minimum value of each maximum link utilization α are calculated. A traffic rate ($X_{ij}^{kl}$) in which the degree of resource utilization is minimized in the minimized maximum link utilization α is calculated using the calculated amount of assignments of each traffic requirement and which is assigned to each link. Multiple paths corresponding to each traffic requirement and traffic division ratios of the multipath are calculated using the calculated traffic rate.

14 Claims, 3 Drawing Sheets

CONSTRAINED MULTIPATH ROUTING METHOD IN A MULTI-PROTOCOL LABEL SWITCHING (MPLS) NETWORK

BACKGROUND OF THE INVENTION

1. Field of the Invention

The present invention relates generally to constrained multipath routing methods, and more particularly to a constrained multipath routing method, which finds multiple paths for satisfying the policy of restrictive conditions such as required amounts of traffic between routers, a set maximum hop count and specific node/link inclusion/exclusion conditions, accompanied when paths are routed in a multi-protocol label switching network, and an optimal divided amount of traffic for each path, and a computer-readable recording medium, which stores a program for performing the routing method.

2. Description of the Prior Art

Recently, as both the number of Internet users and demands for multimedia services have increased, demands for large capacity communication services enabling the transfer of more Internet traffic are gradually increased. In addition, Broadband Integrated Services Digital Networks (B-ISDN) have rapidly been developed so as to meet requests for a variety of services including electronic mail services, electronic commerce, moving picture services like Internet broadcast, remote video conferencing, home shopping, online real time games and home networking using the Internet.

In a conventional backbone network, a traffic engineering method is performed by just bypassing the traffic at a bottleneck point using a single path. Currently, Internet routers mostly transmit traffic on the basis of a single shortest path routing method, and partially use a number of shortest paths having the same cost, that is, an equal cost multipath. However, because the Internet using Multiprotocol Label Switching (MPLS) technology that is recently developed and utilized can support routing using another paths in addition to the shortest path, it can complement the disadvantages of the conventional traffic engineering method. Such MPLS is a transfer mechanism designed to provide flowability and expandability of the Internet Protocol (IP) while providing a quality of service (QoS) equal to Asynchronous Transfer Mode (ATM) or Frame Relay technology. MPLS can provide improved IP services such as a virtual private network (VPN) or traffic engineering, which has recently become a hot issue in the Internet and can be provided by IP network.

As described above, if the traffic engineering method is performed using a multipath routing mechanism, the maximization of the network efficiency and the optimization of the resource utilization can be realized. In order to perform this, each path of traffic must be calculated in consideration of a required amount of traffic between routers, a maximum hop count of set path and specific node/link inclusion/exclusion conditions together with each other, and further the amount of traffic to be included in each calculated path must be calculated.

In fact, with regard to a backbone network supervisor, it is a significant matter to set a path so as to minimize the maximum value of the degree of utilization of each link in the network and the degree of resource utilization of the entire network when traffic requirements between routers are given. When a bottleneck point continuing for a long time is generated in the Internet, the conventional Internet traffic engineering method solves the problem by expanding the capacities of switch/router and a link as a solution of physical/link layers. As another solution, a method for setting a new path not passing through the bottleneck point by varying a metric assigned to the interface of the router is used as a solution of a third layer, thus allowing the confusion occurring at a specific bottleneck point to be solved.

However, such conventional technologies are problematic in that it takes too much time to adapt the solutions to the network from a time point of the derivation of the solutions, costs are increased, and the bottleneck of the network is just moved to another point rather than basically solved.

In the prior art, a first thesis entitled "Explicit routing algorithms for Internet traffic engineering" in 1999 discloses an explicit routing algorithm for Internet traffic engineering so as to solve a traffic engineering problem capable of calculating multiple paths and a traffic division ratio of each path to minimize a maximum link utilization, by a linear programming. The first thesis is designed as a routing algorithm to minimize a maximum link utilization in the MPLS network. Here, in the multipath routing algorithm of the first thesis, after the degree of maximum link utilization is minimized by performing a modeling method using a linear programming, the multipath corresponding to each traffic requirement and sequential traffic division ratio of each path are obtained. However, such method is disadvantageous in that it only considers the maximum link utilization as the basis of the optimization process, but excludes the optimization basis for minimizing the degree of resource utilization, such that the hop count is increased when the path is routed, thus preventing the routing algorithm from displaying optimal efficiency.

A second thesis entitled "Analytical framework for dynamic traffic partitioning in MPLS networks" in 2000 discloses a method for calculating a traffic division ratio on multiple paths, which can minimize delay or packet loss rate in the MPLS network which is capable of satisfying the quality of services (QoS). The method divides traffic on multiple paths by calculating optimal traffic division ratios in consideration of a minimum delay time or a packet loss rate in the multiple paths preset by a routing protocol. However, in the second thesis, the traffic division ratio is calculated by only considering the minimum delay time or the packet loss rate as the basis for optimization, without considering the maximum link utilization and minimum resource utilization, such that the bottleneck of the network cannot be basically solved, and in particular there is an overhead that the traffic division ratio must be always calculated with respect to only a single traffic requirement.

Further, in the U.S. Pat. No. 5,727,051, a method and system for deciding a virtual path capacity so as to make blocking probabilities of all physical links in the ATM network as uniform as possible is disclosed. However, the method and the system is problematic in that it considers only a single path, thus it can be adapted only to a network in which the traffic flowing into the network follows an Erlang distribution. Moreover the method decides the capacity without reflecting restrictive conditions included in the virtual paths, thereby preventing the method and the system from fulfilling requests for high speed communication service.

SUMMARY OF THE INVENTION

Accordingly, the present invention has been made keeping in mind the above problems occurring in the prior art, and an object of the present invention is to provide a constrained multipath routing method, which can satisfy the policy of restrictive conditions such as a maximum hop count and specific node/link inclusion/exclusion conditions while minimizing the degree of maximum link utilization, and the degree of network resource utilization in the backbone network applying MPLS technology, and optimize the efficiency of the backbone network, and a computer-readable record medium, which stores a program for performing the routing method.

In order to accomplish the above object, the present invention provides a constrained multipath routing method in a Multi-protocol Label Switching (MPLS) network, comprising the steps of a) setting MPLS network conditions and traffic requirements assigned to each link; b) calculating the amount of assignments of each traffic requirement assigned to each link and a minimum value of each maximum link utilization $\alpha$; c) calculating a traffic rate ($X_{ij}^{kl}$) in which the degree of resource utilization is minimized in the minimized maximum link utilization $\alpha$ using the calculated amount of assignments of each traffic requirement and which is assigned to each link; and d) calculating multiple paths corresponding to traffic requirements and traffic division ratios of the multiple paths.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
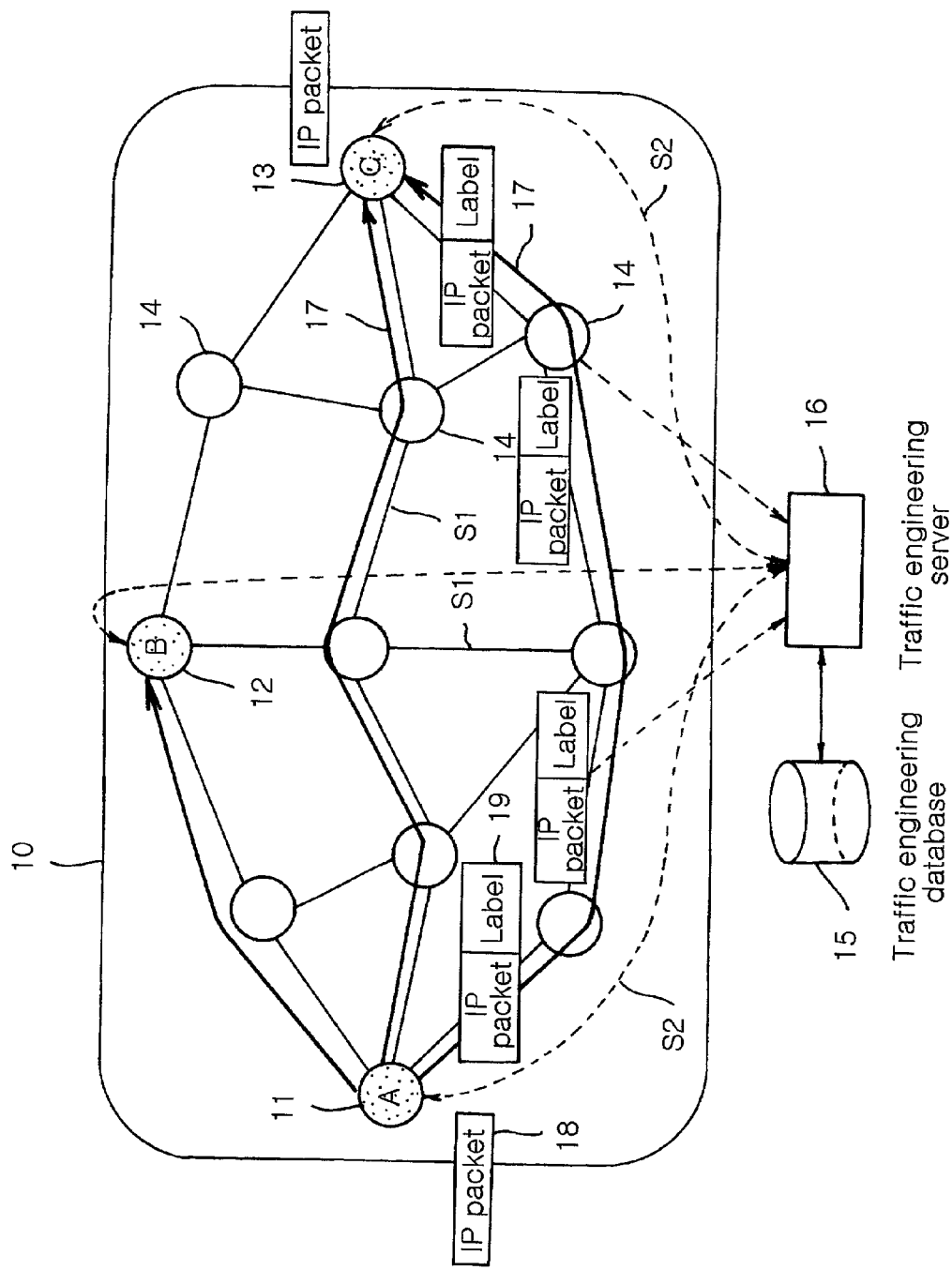
FIG. 1 is a view showing a traffic engineering server and a database connected to a MPLS network according to a preferred embodiment of the present invention.

FIG. 1 is a view showing a traffic engineering server and a database connected to a MPLS network according to a preferred embodiment of the present invention. Referring to FIG. 1, a network 10 to which the MPLS technology is applied assigns each label 19 with a fixed size to each IP packet 18 arriving at an ingress router 11, and intermediate routers 14 refer to only labels 19 instead of IP headers, thus allowing the routers to be switched at high speed. Egress routers 12 and 13 remove each label 19 of a fixed size assigned at the ingress router 11, and then transfer only IP packet 18 to the conventional Internet not employing the MPLS technology. Paths for transferring packets using a label switching method in the MPLS network can be preset by the exchange of a routing table or the use of an additional signaling protocol, or can be explicitly set by an administrator. The routers of the MPLS network display state information of each node and link using a link-state routing protocol (S1).

On the other hand, a traffic engineering server 16 collects the element information and the state information of a plurality of nodes and links included in the MPLS network (S2), and constructs a traffic engineering database 15. Further, the traffic engineering server 16 calculates each label switched path (LSP) 17 connecting the ingress router 11 and the egress routers 12 and 13 using the traffic engineering database 15, and then sets the LSP 17. The traffic engineering server 16 periodically (for example, every week, or every month) calculates paths for optimizing the network efficiency to be set or reconstructed, instead of using an online method which promptly calculates a path to be set whenever the LSPs are set.

The present invention provides a method for calculating multiple paths satisfying optimal conditions in calculating the LSPs and deciding the amount of traffic to be assigned to each LSP as described above, and setting the multiple paths. For example, provided that the LSP connecting the ingress router 11 and the egress router 13, as shown in FIG. 1, is calculated and set, more than two LSPs 17 are calculated and set regardless of paths set by the conventional routing protocol (Interior Gateway Routing Protocol: IGP), such that packet flows received from the ingress router 11 and forwarded to the egress router 13 are divided at a proper ratio to be divisionally transferred to each LSP. If such procedures are repeatedly performed between the ingress router 11 and the egress routers 12 and 13, the degree of resource utilization of the entire network can be optimized.

Figure 2:
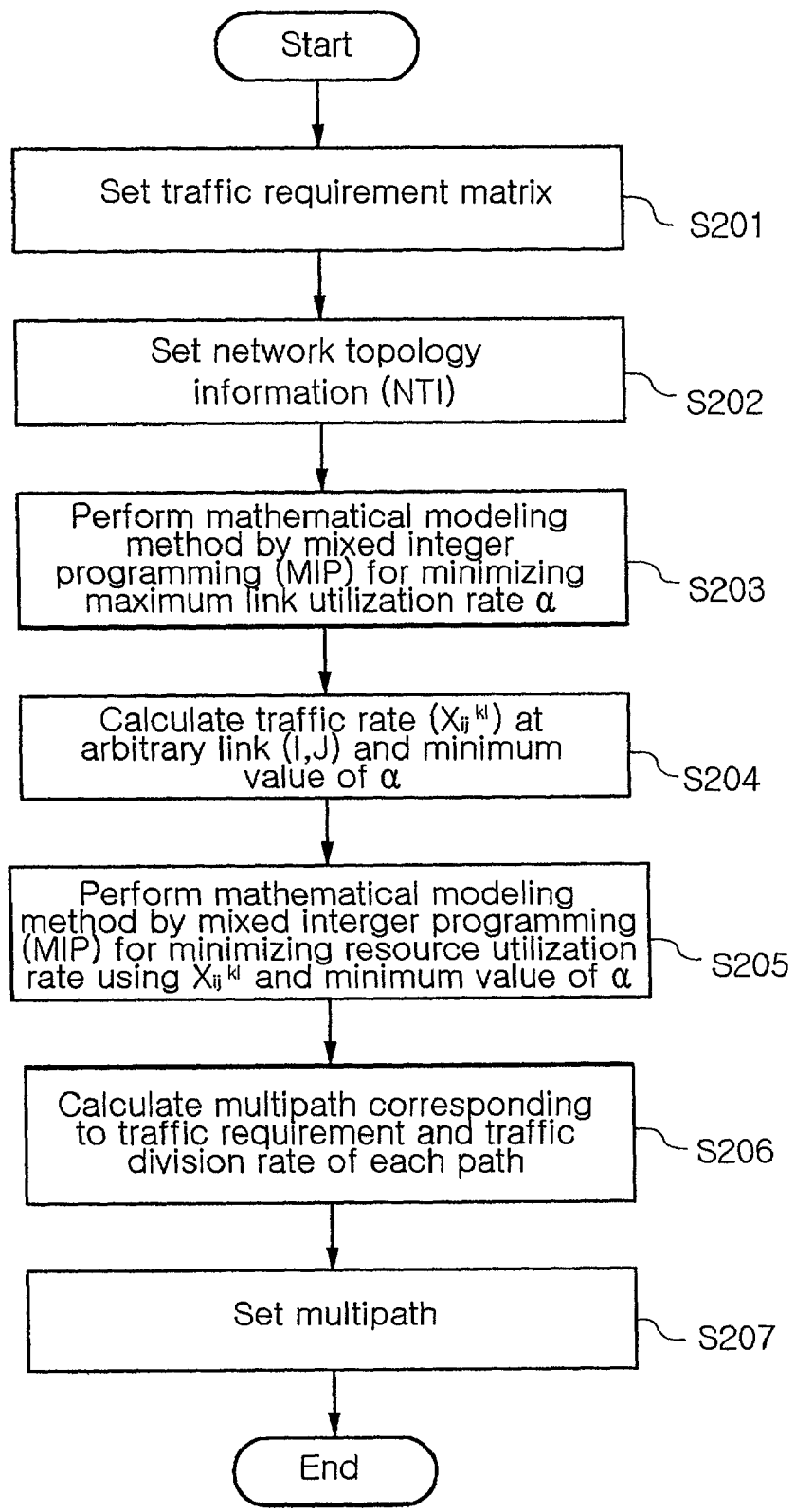
FIG. 2 is a flowchart of a multipath setting process according to a preferred embodiment of this invention.

FIG. 2 is a flowchart of a multipath setting process according to a preferred embodiment of this invention. First, a traffic requirement matrix in which given network link connection information, link capacity information, node information and the amount of traffic required between ingress node and egress nodes are recorded with respect to all nodes is recorded as an input condition for the multipath setting process (S201). Then, overall network status information, namely, network topology information (NTI) such as the amount of traffic of each link, information of this traffic amount and connection/disconnection information of a link as well as physical information like link connection information of the network is set (S202). In the above traffic requirement matrix, a prediction value for the amount of traffic required between nodes of the network is stored in a memory of each router in the form of a database when an Internet service provider constructs a network. Preferably, the prediction value is a value obtained by measurement or the amount of traffic explicitly required by a user as in the case of a virtual private network (VPN) service. The prediction value is extracted from NTI, which is the overall network status information.

The traffic engineering problem for minimizing the maximum link utilization $\alpha$ is mathematically modeled by a mixed integer programming (MIP) using the traffic requirement matrix and the NTI (S203).

Both the maximum value $\alpha$ of utilization of each link in the network and a total amount of resources assigned to each LSP in the network are used as factors for verifying the optimization of the network of this invention. It can be recognized as the optimal condition when the maximum link utilization $\alpha$ is minimized and the total amount of the resource utilization is further minimized.

Therefore, in the present invention, the maximum hop count allowed per a LSP, namely, hop limit, a specific node/link inclusion/exclusion condition, and a load division ratio of each path when the multiple paths are used are simultaneously taken into consideration, while keeping both the maximum link utilization $\alpha$ and the total amount of the resource utilization optimal. Especially, when the multiple paths are used, the traffic between input and output nodes is divided into several classes. In this case, it is practical to discretely calculate this traffic division ratio, so the discrete calculation condition is included in the present invention.

For this operation, terms used at step S203 are described and then modeling methods of the network and input conditions are described as follows. First, the network is described as a direction graph G=(V, E) in which a link source and a link destination are set different from each other. Here, V is a set of nodes included in the network, and E is a set of the links. In the direction graph, a link from a source a to a destination b and a link from a source b to a destination a are set different from each other.

The capacity of each link ((i, j) ∈ E) of the network is defined as $c_{ij}$. Here, i and j are nodes in the network, and (i, j) is a link from node i to node j. Further, $c_{ij}$ is a bandwidth of the link from the node i to the node j.

Further, each traffic requirement (k ∈ K) is given to a pair of the ingress router $S_k$ and egress router $t_k$. Here, k is an element of the traffic requirement matrix 21 for finding a path capable of receiving a predetermined amount of traffic, and K is a universal set of k.

A path can be set to pass any routers in setting a path, wherein the number of the passed routers is called a hop count. The maximum allowable hop count (hop limit) $L_k$ of a path with respect to the traffic requirement is defined as $L_k=L_{sp(k)}+H$, where $L_{sp(k)}$ is the hop count of a shortest hop path to k, and H is an additional hop count.

Meanwhile, $X_{ij}^{kl}$ is a variable representing how much the traffic requirement k having a hop count equal to or less than l is assigned to the link (i, j). In other words, $X_{ij}^{kl}$ represents the amount of the assignments of the traffic requirement k having a hop count of l to the link from the node i to the node j. Accordingly, $X_{ij}^{kl}$ from the transmitter $s_k$ node i to the node j is equal to or less than l hop.

Further, $d_k$ is a variable used for making the sum of all traffic outputted from the transmitter $s_k$ equal to 1. For example, provided that the sum of all traffic outputted from the transmitter is 10 MB, a variable required to make the sum equal to 1 is 10 MB. Similar to this, provided that the sum is 50 MB, a required variable becomes 50 MB. In the above two cases, the values of $d_k$ are 10 MB and 50 MB, respectively.

A ratio for dividing traffic with respect to an arbitrary path, namely, a traffic division ratio g has a discrete value between 0 and 1. For example, if g is set to a value of 0.2, a variation range of the division ratio being assignable per path is 0.2 in its lowest value. Therefore, when three paths are used, the division ratios of the three paths can be assigned as (0.2, 0.4, 0.4) or (0.2, 0.2, 0.6), wherein the sum of the division ratios becomes 1. In other words, this traffic division ratio is the ratio for dividing traffic when it is assumed that the sum of traffic outputted (or inputted) from (or to) the transmitter (or receiver) is set to 1.

As described above, if restrictive conditions such as the maximum allowable hop count and the discrete traffic division ratio g, with respect to the traffic requirement k of each of input/output node are given, mathematical models by the mixed integer programming (MIP) with regard to the problem for minimizing the maximum value α of the link utilization, which is the basis of the estimation of the network efficiency, are defined as Equation group 1.

Equation group 1

$$\sum_{j:(i,j)\in E} X_{ij}^{kl} = 1, k \in k, i = s_k, l = 1 \quad [1]$$

$$\sum_{j:(i,j)\in E} X_{ij}^{kl} = 0, k \in k, i \neq s_k, l = 1 \quad [2]$$

$$\sum_{j:(i,j)\in E} X_{ij}^{kl} - \sum_{j:(j,i)\in E} X_{ji}^{km} = 0, k \in k, i \neq s_k, t_k, L, > l > 1, m = l+1 \quad [3]$$

$$\sum_{l=1}^{L_k}\sum_{j:(i,j)\in E} X_{ji}^{kl} = 1, k \in k, i = t_k \quad [4]$$

$$\sum_{j:(i,j)\in E} X_{ij}^{kl} = 0, k \in k, i = t_k \quad [5]$$

-continued $$\sum_{l=1}^{L_k}\sum_{k\in K} d_k X_{ij}^{kl} \leq c_{ij}a, \forall (i, j) \in E \quad [6]$$

$$X_{ij}^{kl} = M_{ij}^{kl} \cdot g \quad [7]$$

$$0 \leq X_{ij}^{kl} \leq 1, a \geq 0 \quad [8]$$

$$0 \leq M_{ij}^{kl} \lfloor 1/g \rfloor, M_{ij}^{kl} \in Z, 0 < g \leq 1 \quad [9]$$

In the present invention, the minimum value of the maximum link utilization α and $X_{ij}^{kl}$ satisfying the minimum value are primarily obtained by setting the above conditions as shown in Equation group 1 and then performing the mathematical modeling method using the MIP of step S203 (S204). Here, Equation [1] is a flow condition to the first hop of the ingress router $s_k$, and represents that the total amount of traffic outputted from an arbitrary transmitter $s_k$ at the first hop is equal to 1. Equation [2] is a flow condition to a first hop of an intermediate node not the ingress router $s_k$, and represents that the total amount of traffic outputted from the intermediate node at the first hop is equal to 0. This shows that there is no traffic additionally outputted from the intermediate node. Equation [3] is a flow keeping condition between lth and l+1th hop counts, and represents that the amount of input traffic is the same with the output traffic in the intermediate node.

Equations [4] and [5] are flow conditions of the egress router $t_k$, and Equation [4] represents that the total amount of traffic inputted to the destination, that is, the receiver $t_k$ is equal to 1. Compared with Equation [1], Equation [4] represents a condition that the total amount of traffic outputted from the transmitter $s_k$ is altogether inputted to the receiver $t_k$. Equation [5] represents the condition that the total amount of traffic outputted from the receiver $t_k$ is equal to 0. In other words, Equation [5] shows that the total amount of the input traffic is equal to 1, while the total amount of the output traffic is equal to 0 in the receiver $t_k$.

Equation [6] represents a condition that the total amount of flows assigned to a link must be smaller than the maximum capacity of the link. That is, Equation [6] is the condition that the total amount of traffic assigned to the link is smaller than the maximum capacity of a corresponding link. If the capacity $c_{ij}$ of a corresponding link is 10 MB, the maximum utilization capacity in practically used is calculated by multiplying $c_{ij}$ by α.

Further, Equation [7] is a condition used for assigning an ideal traffic division ratio, and represents the condition for dividing traffic assigned to each link. Here, $X_{ij}^{kl}$ is the number of paths divided according to the traffic division ratio g.

Therefore, as described above, the link utilization α satisfying each condition shown in Equation group 1 and $X_{ij}^{kl}$ representing the number of the assignments of the traffic requirement k having a hop count of l to an arbitrary link (i,j) are obtained through the MIP modeling method. Here, the maximum value of the link utilization α is one constant and the $X_{ij}^{kl}$ can be plural.

Then, after the minimum value of the maximum link utilization α obtained at step S204 is fixed to a constant C, a procedure for minimizing the sum of all resources used in the network, as a new optimization basis of the network, is performed (S205). In other words, a value for minimizing the sum of $X_{ij}^{kl}$ while satisfying the minimum value of the maximum link utilization a obtained at step S204 is to be found. For example, provided that with respect to a link from the source $s_k$ to the destination $t_k$, the maximum link utilization $\alpha$ is constantly maintained in its minimum value, if $X_{ij}^{kl}$ is satisfied in case of the hop count of 4 and further satisfied in case of the hop count of 3, the degree of resource utilization is more reduced in case of the hop count of 3. As described above, the step S204 is the procedure for obtaining $X_{ij}^{kl}$ minimizing the degree of resource utilization while satisfying the maximum link utilization $\alpha$. This can be defined as Equation group 2 below.

Equation group 2

$$\text{Minimize} \sum_{(i,j) \in E} X_{ij}^{kl}$$

In order to obtain the required $X_{ij}^{kl}$, the modeling method using the above MIP is used again at step (S205). Accordingly, Equation group 1 is used as an optimization basis. Here, the maximum link utilization $\alpha$ is substituted for a constant C. The process of MIP modeling for substituting the maximum link utilization a for the constant and obtaining $X_{ij}^{kl}$ in which the degree of resource utilization is minimized is described above (with reference to Equation group 1), and so the repeat descriptions are omitted.

As described above, mathematical modeling method by MIP is performed using the traffic rate $X_{ij}^{kl}$ assigned to each link (S205), which is obtained at step S204. Further, the multiple paths corresponding to each traffic requirement k and the traffic division ratios are calculated (S206). In this case, in order to easily calculate the multiple paths and the traffic division ratios, an augmented shortest path algorithm, which is a method for solving a maximum flow problem and is typically used and well known to this field, can be used. Here, it should be noted that persons skilled in the art can easily derive the multipath corresponding to each traffic requirement k and the traffic division ratio using the traffic rate $X_{ij}^{kl}$ assigned to each link from the well known augmented shortest path algorithm.

As described above, the multipath for minimizing both the maximum link utilization $\alpha$ and the degree of resource utilization, in addition to satisfying the restrictive condition of the used hop count, is set through the above procedures when the multiple paths are set (S207).

Meanwhile, the specific node/link inclusion/exclusion restrictive conditions at step S203 or S205 can be solved by additionally defining the following Equations using the augmented shortest path algorithm. First, a node exclusion condition is defined as in the following Equation group 3 using a specific node exclusion set $E_k^N$.

Equation group 3

$$\sum_{j:(i,j) \in E} X_{ij}^{kl} = 0, \forall i \in E_N^k, \forall l \quad [10]$$

$$\sum_{j:(j,i) \in E} X_{ji}^{kl} = 0, \forall i \in E_N^k, \forall l \quad [11]$$

In the specific node exclusion condition of Equation group 3, the above Equations [10] and [11] are flow conditions to an arbitrary hop of an arbitrary router, and represent that the total amount of traffic outputted from a specific node is equal to 0 and the total amount of traffic inputted to the specific node is also equal to 0. This means that a path does not pass through the specific node.

Further, a node inclusion condition can be defined as following Equation group 4 using a specific node inclusion set $I_k^N$.

Equation group 4

$$\sum_{j:(i,j) \in E} X_{ij}^{kl} > 0, \forall i \in E_N^k, \forall l \quad [12]$$

$$\sum_{j:(i,j) \in E} X_{ji}^{kl} > 0, \forall i \in E_N^k, \forall l \quad [13]$$

In the specific node inclusion condition of Equation group 4, the above Equations [12] and [13] are flow conditions to an arbitrary hop of an arbitrary router, and represent that the total amount of traffic outputted from a specific node is larger than 0 and the total amount of traffic inputted to the specific node is also larger than 0. This means that there is at least one inputted or outputted traffic larger than 0 on the specific node, and a path passes through the specific node.

Similarly to the node inclusion/exclusion conditions, link inclusion/exclusion conditions can be defined using the same methods as Equation groups 3 and 4.

As described above, after the above procedures are performed, multiple paths for each traffic requirement k and traffic division ratios are calculated and the results are signaled explicitly by each ingress router, such that the inputted traffic is divided into multiple classes for the calculated multiple paths and then transmitted. In order to divide the traffic into classes for the multiple paths, streams of input packets are each modeled as flows to use a hashing table of each flow.

Figure 3:
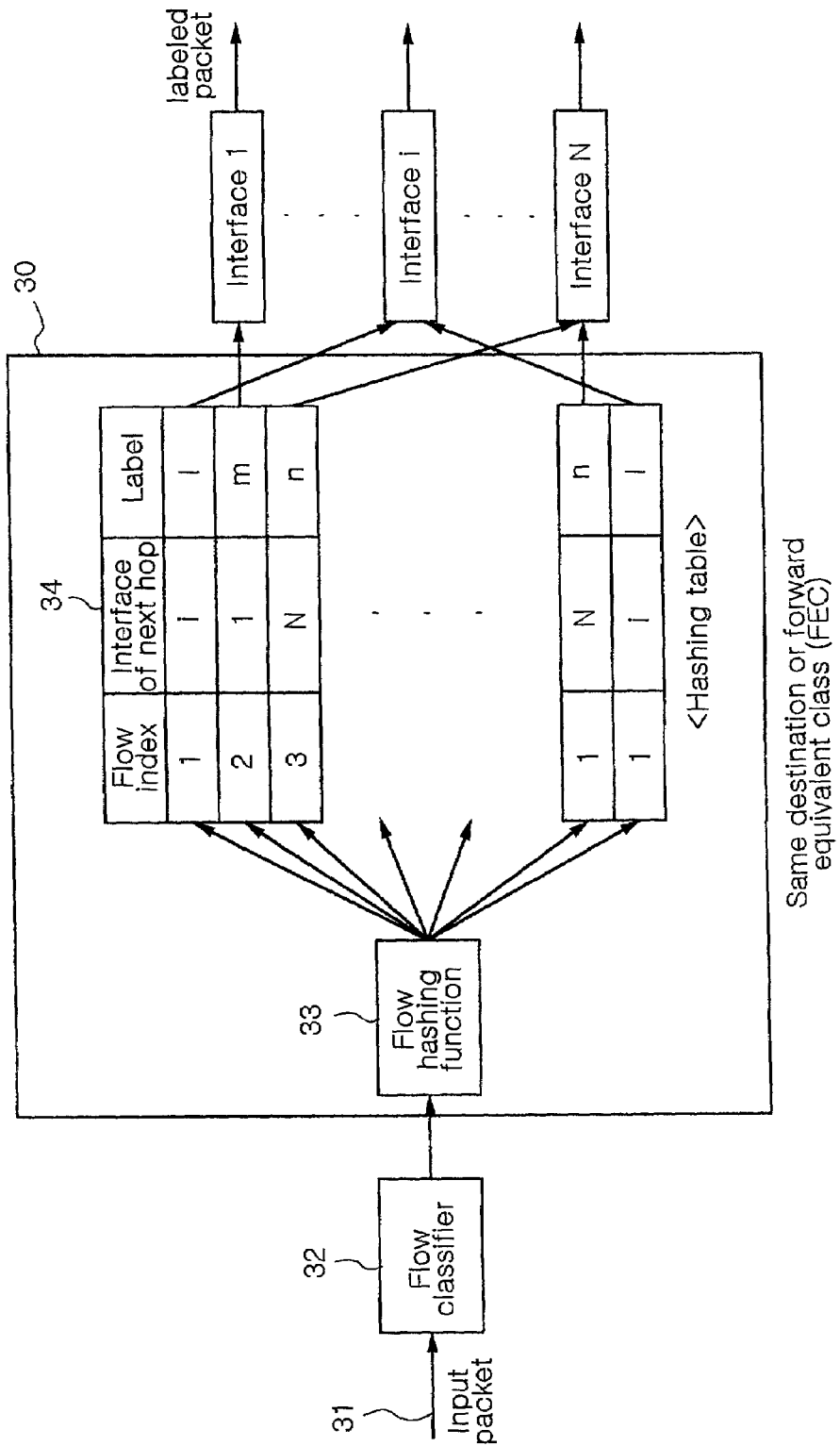
FIG. 3 is a block diagram of a device for performing a traffic division method into multiple paths using a hashing function according to the present invention.

FIG. 3 is a block diagram of a device for performing a traffic division method into the multiple paths using a hashing function of this invention. As shown in FIG. 3, when a packet 31 is inputted, a flow classifier 30 classifies flows differently according to the input packet 31. For example, the flows are classified according to packets for an electronic mail, an image transmission, and a Web site search. The classified flows are each generated as a flow index 34 through a flow hashing function 33 of a same destination or a forward equivalent class (FEC) 30 and assigned. In this case, an identification of each flow, an interface identification of the next hop, and a label of each packet are assigned to each flow index 34. Therefore, each classified flow is connected to each interface corresponding to the index assigned to each flow.

In other words, the ingress router divides the traffic flows of the same destination or forward equivalent class (FEC) 30 into multiple classes for the multiple paths using a hashing table. The flow classifier 32 discriminates IP packet streams by the flows and then generates the flow index values using the flow hashing function 33. These index values are mapped into index values of the next hop.

As described above, the routing method of this invention can be embodied as a program to be stored as data of the computer-readable form in a record medium such as a compact disc read only memory (CD-ROM), a random access memory (RAM), a ROM, a floppy disc, a hard disc, an optical-magnetic disc, and others.

As described above, the present invention provides a constrained multipath routing method and a MPLS traffic engineering method using the multiple paths routing method, which can optimize a traffic division ratios of the multiple paths while satisfying restrictive conditions such as required amounts of traffic between routers, a set maximum hop count and specific node/link inclusion/exclusion conditions, accompanied with when paths are routed in the Internet. Further, the present invention is advantageous in that it executes a traffic engineering using the present invention, thus optimizing the efficiency of a backbone network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A constrained multipath routing method in a Multi-Protocol Label Switching (MPLS) network, comprising the steps of:
    a) setting MPLS network conditions and traffic requirements assigned to each link;
    b) calculating the amount of assignments of each traffic requirement assigned to each link and a minimum value of each maximum link utilization $\alpha$;
    c) calculating a traffic rate ($X_{ij}^{ki}$) in which the degree of network resource utilization is minimized in the minimized maximum link utilization $\alpha$ using the calculated amount of assignments of each traffic requirement and which is assigned to each link;
    d) calculating multiple paths corresponding to the input traffic requirements and traffic division ratios of the multiple paths using the calculated traffic rate and a traffic corresponding to the traffic rate of each path satisfies a restrictive condition of maximum allowable hop count; and
    e) setting a multipath which satisfies the restrictive condition of maximum allowable hop count.

2. The constrained multipath routing method according to claim 1, wherein the step d) includes the step e) of dividing input traffic into multiple classes for the calculated multiple paths according to the traffic division ratio.

3. The constrained multipath routing method according to claim 1, wherein in the step b) the minimum value of the maximum link utilization of each link is calculated by applying a mathematical modeling method by using a mixed integer programming (MIP).

4. The constrained multipath routing method according to claim 1, wherein in the step c) the traffic rate is calculated by applying a mathematical modeling method by using a mixed integer programming (MIP).

5. The constrained multipath routing method according to claim 1, wherein the method calculates multiple paths additionally including a specific node/link and a traffic division ratio of each path.

6. The constrained multipath routing method according to claim 1, wherein the method calculates multiple paths excluding a specific node/link and a traffic division ratio of each path.

7. A computer-readable record medium for recording a program in a Multi-Protocol Label Switching (MPLS) network, the program executing the functions of:
    a) setting MPLS network conditions and traffic engineering requirements assigned to each link;
    b) calculating the amount of assignments of each traffic requirement assigned to each link and a minimum value of each maximum link utilization $\alpha$;
    c) calculating a traffic rate in which resource utilization is minimized in the minimized maximum link utilization using the calculated amount of assignments of each traffic requirement and which is assigned to each link;
    d) calculating multiple paths corresponding to each traffic requirement and traffic division ratios of the multiple paths using the calculated traffic ratios and a traffic corresponding to the traffic rate of each path is calculated by applying a discrete traffic division ratio; and
    e) setting a multipath which satisfies the discrete traffic division ratio.

8. A constrained multipath routing method in a Multi-Protocol Label Switching (MPLS) network, comprising the steps of:
    a) setting MPLS network conditions and traffic requirements assigned to each link;
    b) calculating the amount of assignments of each traffic requirement assigned to each link and a minimum value of each maximum link utilization $\alpha$;
    c) calculating a traffic rate ($X_{ij}^{ki}$) in which the degree of network resource utilization is minimized in the minimized maximum link utilization $\alpha$ using the calculated amount of assignments of each traffic requirement and which is assigned to each link;
    d) calculating multiple paths corresponding to the input traffic requirements and traffic division ratios of the multiple paths using the calculated traffic rate and a traffic corresponding to the traffic rate of each path is calculated by applying a discrete traffic division ratio; and
    e) setting a multipath which satisfies the discrete traffic division ratio.

9. The constrained multipath routing method according to claim 8, wherein the step d) includes the step e) of dividing input traffic into multiple classes for the calculated multiple paths according to the traffic division ratio.

10. The constrained multipath routing method according to claim 8, wherein in the step b) the minimum value of the maximum link utilization of each link is calculated by applying a mathematical modeling method by using a mixed integer programming (MIP).

11. The constrained multipath routing method according to claim 8, wherein in the step c) the traffic rate is calculated by applying a mathematical modeling method by using a mixed integer programming (MIP).

12. The constrained multipath routing method according to claim 8, wherein the method calculates multiple paths additionally including a specific node/link and a traffic division ratio of each path.

13. The constrained multipath routing method according to claim 8, wherein the method calculates multiple paths excluding a specific node/link and a traffic division ratio of each path.

14. The constrained multipath routing method according to claim 8, wherein the discrete traffic division ratio has a discrete value between 0 and 1.

* * * * *